United States Patent
Thusoo et al.

(10) Patent No.: US 7,617,249 B2
(45) Date of Patent: Nov. 10, 2009

(54) METHOD AND SYSTEM OF HANDLING DOCUMENT OPERATION REQUESTS ON DOCUMENTS HAVING LARGE COLLECTIONS WITH CONSTRAINED MEMORY

(75) Inventors: Ashish Thusoo, Foster City, CA (US); Sivasankaran Chandrasekar, Palo Alto, CA (US); Ravi Murthy, Fremont, CA (US); Eric Sedlar, San Francisco, CA (US); Nipun Agarwal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 415 days.

(21) Appl. No.: 10/656,795

(22) Filed: Sep. 6, 2003

(65) Prior Publication Data

US 2005/0055326 A1 Mar. 10, 2005

(51) Int. Cl.
*G06F 12/00* (2006.01)
*G06F 17/30* (2006.01)
(52) U.S. Cl. .............................. 707/200; 707/1; 707/2; 707/205
(58) Field of Classification Search ................. 707/200, 707/1, 2, 205
See application file for complete search history.

(56) References Cited

U.S. PATENT DOCUMENTS

| | | | | |
|---|---|---|---|---|
| 5,392,415 A | * | 2/1995 | Badovinatz et al. | 718/100 |
| 5,446,854 A | * | 8/1995 | Khalidi et al. | 711/1 |
| 6,081,262 A | * | 6/2000 | Gill et al. | 715/202 |
| 6,832,295 B1 | * | 12/2004 | Stonecypher | 711/135 |
| 6,957,237 B1 | * | 10/2005 | Traversat et al. | 707/206 |
| 7,032,088 B2 | * | 4/2006 | Paladini et al. | 711/158 |
| 2004/0066529 A1 | * | 4/2004 | Wu et al. | 358/1.15 |

OTHER PUBLICATIONS

Gray, J. and A. Reuter "Chapter 13. File and Buffer Management" in *Transaction Processing: Concepts and Techniques*, Morgan Kauffman Publishers, San Mateo, CA (1993) pp. 661-741.
Gray, J. and A. Reuter "Chapter 14. The Tuple-Oriented File System" in *Transaction Processing: Concepts and Techniques*, Morgan Kauffman Publishers, San Mateo, CA (1993) pp. 751-823.
International Search Report and Written Opinion for PCT/US2004/028735 dated Feb. 23, 2005.

(Continued)

*Primary Examiner*—Tim T. Vo
*Assistant Examiner*—Jay A Morrison
(74) *Attorney, Agent, or Firm*—Vista IP Law Group, LLP (57) ABSTRACT

A method and system of handling document operation requests on documents with large collections and constrained memory is disclosed. In some embodiments, when one or more collection elements of a document are required to be in memory for a document operation, each of the one or more required collection elements not already in the memory are loaded into a collection partition in the memory before the document operation is executed.

52 Claims, 7 Drawing Sheets

OTHER PUBLICATIONS

Baeza-Yates, Richardo et al.; Second Edition of the "XML and Information Retrieval" Workshop Held at SIGIR'2002, Tampere, Finland, Aug. 15, 2002, pp. 53-57; SIGIR Forum, Fall 2002, vol. 36, No. 2.

Calado, Pavel P. et al.; The Web-DL Environment for Building Digital Libraries from the Web; Proceedings of the Third ACM/IEEE-CS Joint Conference on Digital Libraries; pp. 346-357; IEEE Computer Society; May 2003.

Carmel, David et al.; Searching XML Documents via XML Fragments; Proceedings of the 26$^{th}$ Annual International ACM SIGIR Conference on Research and Development in Informal Retrieval; Jul. 28-Aug. 1, 2003; pp. 151-158; ACM Press; Toronto, Canada.

Chidlovskii, Boris; Schema Extraction From XML Collections; Proceedings of the 2$^{nd}$ ACM/IEEE-CS Joint Conference on Digital Libraries; Jul. 13-17, 2002; pp. 291-292; ACM Press; Portland, Oregon, USA.

Fuhr; Norbert et al.; Index Compression vs. Retrieval Time of Inverted Files of XML Documents; Proceedings of the 11$^{th}$ International Conference on Information and Knowledge Management; Nov. 4-9, 2002; pp. 662-663; ACM Press; McLean, Virginia, USA.

Fuhr, Norbert et al; HyREX: Hyper-media Retrieval Engine for XML; Proceedings of the 25$^{th}$ Annual International ACM SIGIR Conference on Research and Development in Information Retrieval; Aug. 11-15, 2002, p. 449; ACM Press: Tampere, Finland.

Guo, Lin et al.; XRANK: Ranked Keyword Search over XML Documents: Proceedings of the 2003 ACM SIGMOD International Conference on Management of Data; Jun. 9-12, 2003; pp. 16-27; ACM Press; San Diego, California, USA.

Ipeirotis, Panagiotis G.; Extending SDARTS: Extracting Metadata from Web Databases and Interfacing with the Open Archives Initiative; Proceedings of the 2$^{nd}$ ACM/IEEE—Joint Conference on Digital Libraries; Jul. 13-17, 2002; pp. 162-170; ACM Press; Portland, Oregon, USA.

Kamps, Jaap et al.; XML Retrieval: What to Retrieve?: Proceedings of the 2003 ACM SIGMOD International Conference on Management of Data; Jul. 28-Aug. 1, 2003; pp. 409-410; ACM Press; Toronto, Canada.

Kotsakis; Evangelos; Structured Information Retrieval in XML Documents; Proceedings of the 2002 ACM Symposium on Applied Computing; Mar. 2002; pp. 663-667; ACM Press; Madrid, Spain.

Larson, Ray R.; Distributed Resource Discovery: Using Z39.50 to Build Cross-Domain Information Servers; Proceedings of the 1$^{st}$ ACM/IEEE-CS Joint Conference on Digital Libraries; Jun. 24-28, 2001; pp. 52-53; ACM Press; Roanoke, Virginia, USA.

Larsen, Ray R.: Distributed Resource Discovery and Structured Data Searching with Cheshire II; Proceedings of the 24$^{th}$ Annual International ACM SIGIR Conference on Research and Development in Information Retrieval; Sep. 9-12, 2001; New Orleans, Louisiana, USA; p. 455; ACM Press.

Malaika; Susan et al.; Standards for Databases on the Grid; ACM SIGMOD Record; Sep. 2003; vol. 32 Issue 3; pp. 92-100; ACM Press.

Moh, Chuang-Hue et al.; Re-Engineering Structures from Web Documents; Proceedings of the Fifth ACM Conference on Digital Libraries; Jun. 2000; pp. 67-76; ACM Press.

Pokorny, Jaroslav; Modeling Stars Using XML; Proceedings of the 4$^{th}$ ACM International Workshop on Data Warehousing and OLAP; Nov. 9, 2001; Atlanta, Georgia, USA; pp. 24-31; ACM Press.

* cited by examiner

FIG. 6

METHOD AND SYSTEM OF HANDLING DOCUMENT OPERATION REQUESTS ON DOCUMENTS HAVING LARGE COLLECTIONS WITH CONSTRAINED MEMORY

BACKGROUND AND SUMMARY

The present invention is related to data storage systems. More particularly, the present invention is directed to a method and system of handling document operation requests.

Various types of documents, e.g., XML (extensible Markup Language) documents, may encompass one or more collections. A collection is a set of elements or items. For example, a purchase order document may include multiple line items, where each line item is an element of a purchase order collection.

In conventional data storage systems, before a document operation on a collection is executed, e.g., a read operation, a create operation, a delete operation, an update operation, an insert operation, etc., the whole document is first loaded into memory from one or more data storage devices, e.g., disk drives, where the document is stored. Based on that approach, however, the amount of memory needed to hold an in memory representation of the document is proportional to the number of elements or items in the one or more collections of the document. As a result, documents with collections containing a large number of elements or items may not be completely loadable in the memory. Therefore, document operations cannot be executed in conventional data storage systems on documents having large collections. The minimum size of the document which would cause this failure would depend upon how much physical and virtual memory is available to the process on the system.

Thus, it is desirable to provide a method and system where memory usage is independent of the number of collection elements or items in a document, which would enable larger documents to be loaded into memory for document operation requests.

The present invention provides a method and system for handling document operation requests, such as loading documents having large collections so that document operation requests on this document can be successfully serviced. In one embodiment, when a document operation request is received, a determination is made as to whether the document operation requires one or more collection elements of the document to be in memory. If one or more collection elements of the document are required to be in memory, for each of such element a determination is made as to whether that collection element is within a collection partition already loaded into the memory. For each of the collection elements whose partitions are not already in the memory, the corresponding collection partitions are loaded into the memory from the disk. The document operation is then executed on this partially loaded document. Not all the collection elements are loaded into the memory thereby allowing one to place certain binds on how much memory the in-memory representation of the document would use.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The accompanying drawings are included to provide a further understanding of the invention and, together with the Detailed Description, serve to explain the principles of the invention.

DETAILED DESCRIPTION

Handling of document operation requests is disclosed. Rather than attempting to load each document as a whole into the system memory every time a document operation request is received, only those collection elements needed for the document operation request that are not already in the memory are loaded into the memory. The element and all the elements belonging to its partition are read in from the disk and a new partition can be created to hold these elements in memory. The memory contents can then be moved in and out in units of collection partitions. As a result, memory usage is independent of the number of collection elements in a document. This enables larger documents to be loaded into the memory for document operation requests.

Figure 1:
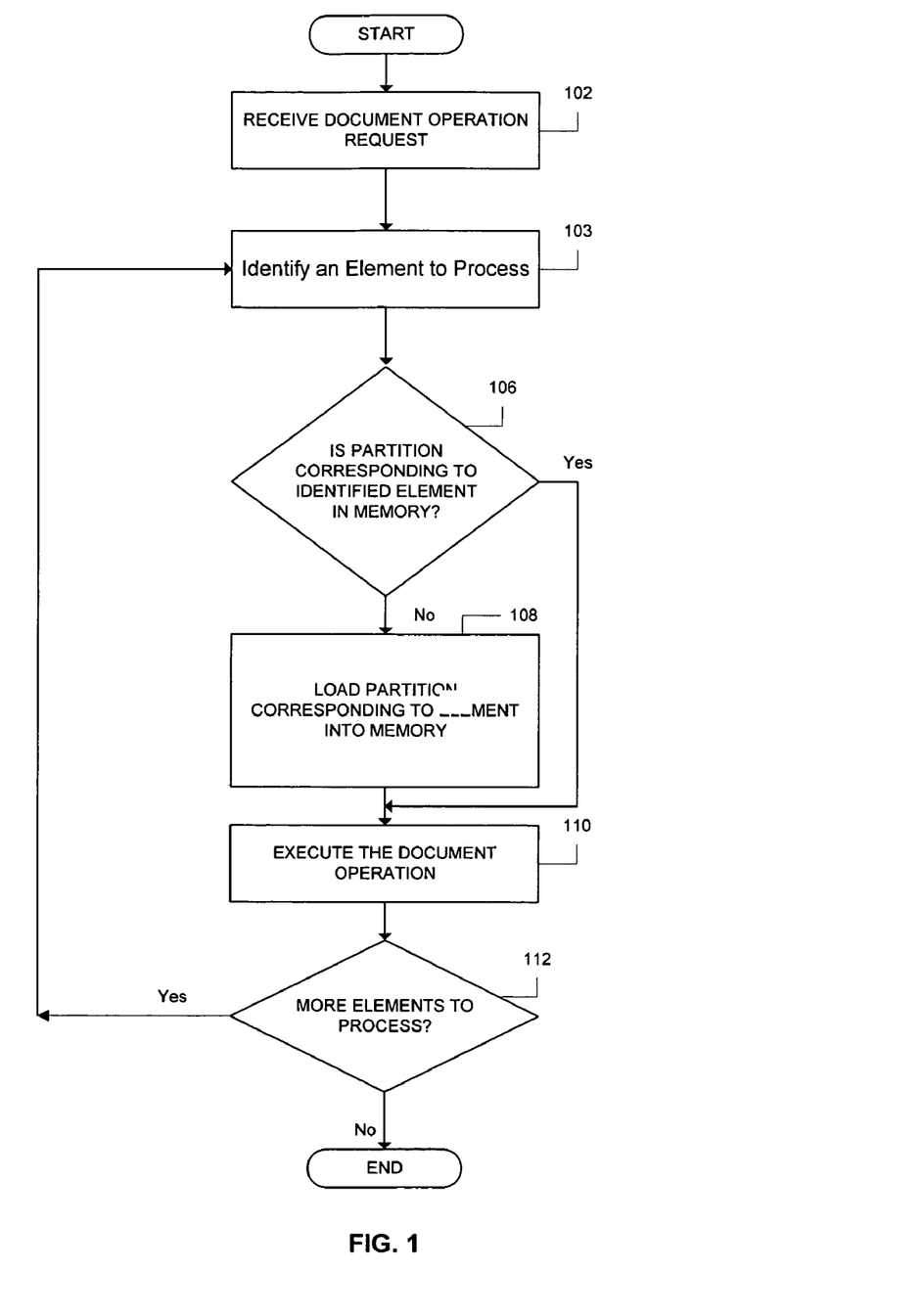
FIG. 1 is a flow chart of a method of handling document operation requests according to an embodiment of the invention.

FIG. 1 illustrates one method of handling document operation requests. A document operation request is received at 102. Each document may include one or more collections and each collection may include one or more elements or items. In some embodiments, the document is an XML document. In other embodiments, the document may be any document that encompasses one or more collections. The operation requested may be a read operation, a delete operation, an insert operation, an update operation, a create operation, etc. At 103, an element is identified for processing according to the document operation request.

A determination is made as to whether the identified collection element is within a collection partition already loaded into the memory (106). In one embodiment, a collection partition is defined as a subset of collection elements in the document and may be defined using a hash-based or range-based partitioning function. In one embodiment, the partition scheme(or function) is defined such that a collection element can belong to at most one collection partition. In other words any two collection partitions are disjoint subsets. Each collection partition in the memory may be limited to a threshold size. The threshold size may be a factor of the memory size and it may also be set by a user, administrator, etc. For example, if the total memory is 100 MB (megabytes), the threshold size may be 1 MB. There are multiple ways of setting this threshold—the absolute size could be directly stated/set, e.g. at 1 MB, or could be determined as a percentage of the total available process virtual memory, e.g., 1% in the previous example. This threshold is controlled by a user tunable configuration parameter, which can be termed the loadableunit_size. A collection partition is a unit in which data is written to or read from a data storage device, e.g., disk drive, etc.

If the identified collection element is already in a collection partition in the memory, then the document operation is executed at 110. If the collection element is not in a collection partition in the memory, then the appropriate collection partition is loaded (108) before the document operation is executed (110). The formulas described with respect to FIG. 4a-b may be used to load the partition at 110. At 112, a determination is made whether more elements need to be processed. If so, then the method returns back to 103 to identify another element to process. For each such element, the partition containing it is identified and moved in from the disk into a memory partition, if needed.

A collection or a portion of a collection may have an in-memory representation as well as an on-disk representation. On a data storage device, each collection may be stored in the form of a CLOB (character large object), in nested tables, or in IOTs (index-only tables—this can also be referred to as OCT-based storage). An index-only table differs from a standard table in that instead of maintaining a separate index for the table, the index and the base table are combined into a single table. In other words, rather than having a row ROWID as the second element of an index entry, the actual data from the corresponding row is stored in the index. Additional information on index-only tables can be found in U.S. Pat. No. 6,128,610, issued Oct. 3, 2000, which is incorporated herein by reference in its entirety for all purposes.

Figure 2:
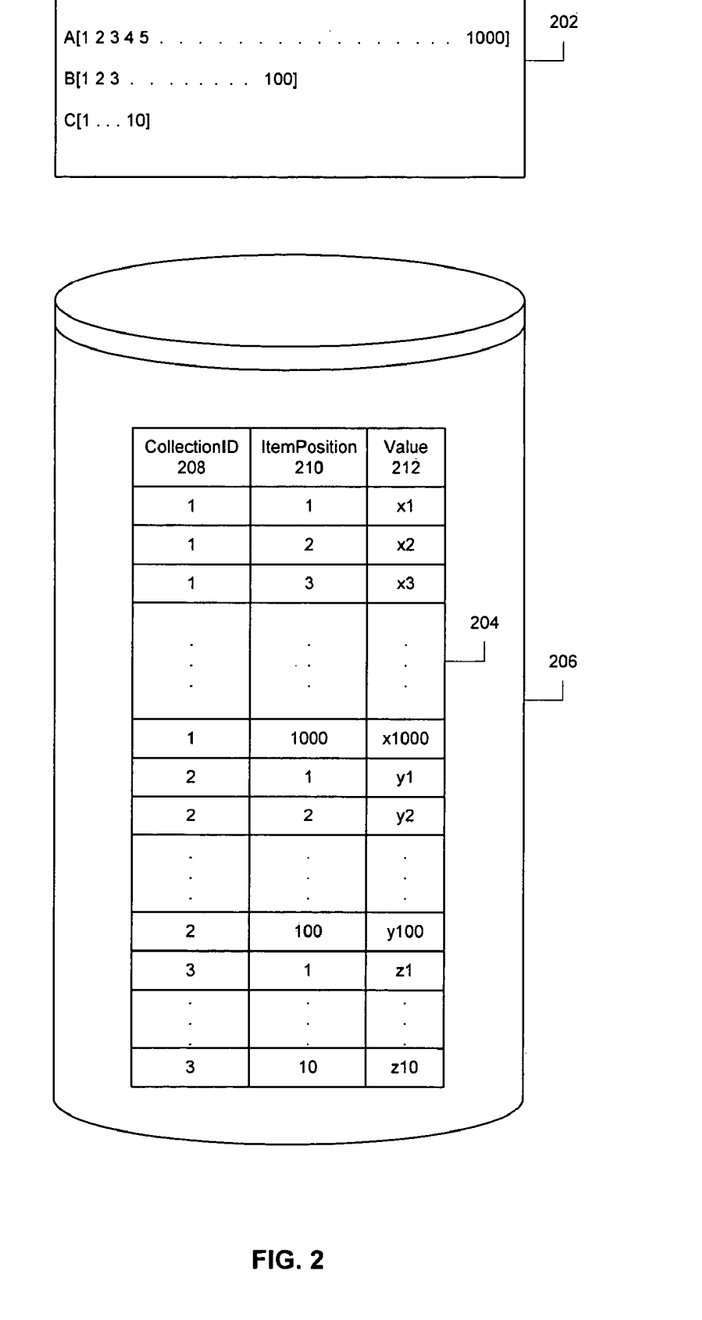
FIG. 2 illustrates examples of in-memory and on-disk representations of document collections according to some embodiments of the invention.

FIG. 2 shows example configurations for both in-memory as well as on-disk representations of three collections, A, B, and C in a data storage system 200. Collection A includes 1000 items, collection B includes 100 items, and collection C includes 10 items. In the embodiment, collections A, B, and C have each been loaded into memory 202 in their entireties. In-memory representations of collections may be similar to arrays as seen in FIG. 2 or could be in the form of more sophisticated array structures, e.g., B-arrays.

Consider if collections A, B, and C in FIG. 2 are stored in an index-only table 204 on a disk 206. Table 204 includes three columns, a "CollectionID" column 208, an "ItemPosition" column 210, and a "Value" column 212. Collection A has a "CollectionID" of 1, collection B has a "CollectionID" of 2, and collection C has a "CollectionID" of 3. Table 204 may be accessed via key columns 208 and 210. For example, to find the value for the first item of collection A, the following query may be submitted:

SELECT Value

FROM Table

WHERE CollectionID=1 AND ItemPosition=1

The above query is in SQL (Structured Query Language), a popular database language. Other database languages may also be used. Additionally, an API can also be provided which natively queries the IOT structure given the key columns and returns the corresponding values.

Figure 3:
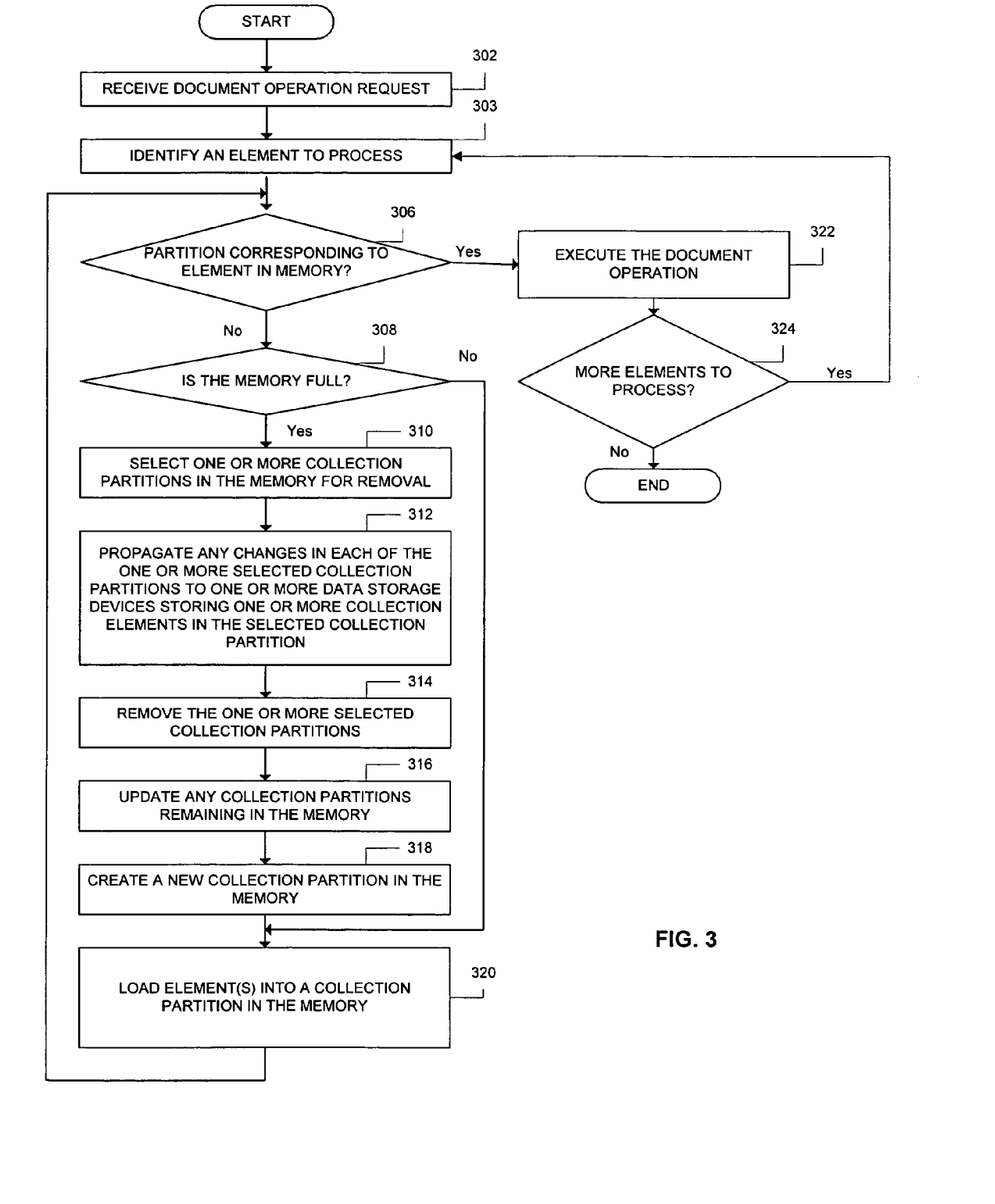
FIG. 3 depicts one embodiment of a method of handling document operation requests.

Depicted in FIG. 3 is another method of handling document operation requests. At 302, a document operation request is received. At 303, identification is made of an element to process according to the document operation request. A determination is made at 306 as to whether the identified collection element is within some collection partition already loaded into memory. If the identified collection element is already in a collection partition in memory, then the document operation is executed at 322.

If the identified collection element is not within a collection partition in the memory, then a determination is made at 308 as to whether the memory is full (i.e. the memory allotted to the document has been exhausted. This is also controlled by another threshold parameter—which can be termed xobmem_bound, and can be tuned by the user). If the memory is not full, then the identified collection element not already within a collection partition is loaded into a new collection partition in the memory (320). While the new collection partition is loaded, elements other than the requested element are also read in. The number of elements read into this new partition is controlled by the threshold parameter loadableunit_size which has been previously described. The process then returns to 306, and since the element is now in a partition in memory, the document operation can be executed at 322.

When the memory is full, one or more collection partitions in the memory are selected for removal at 310. In some embodiments, one or more of the least recently used (LRU) partitions are selected for removal. Any change in the one or more selected collection partitions is propagated to one or more data storage devices storing one or more collection elements in the selected collection partitions (312). Once the one or more data storage devices have been updated with the change(s), the one or more selected collection partitions are removed (314). In some embodiments, the collection partitions that are removed do not contain any of the one or more required collection elements.

Figure 4A:
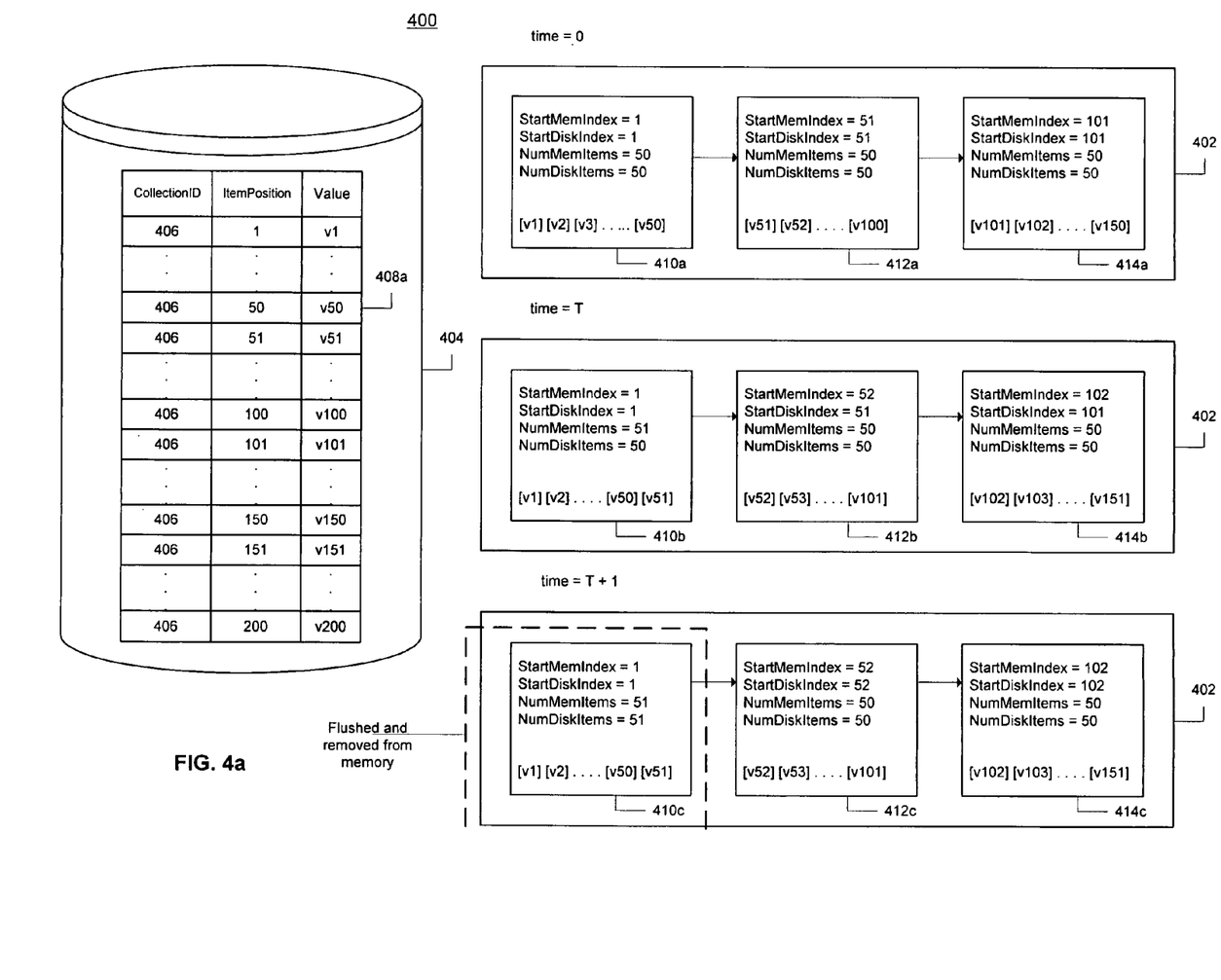
FIGS. 4a-4b shows examples of how document operation requests are handled according to some embodiments of the invention.
Figure 4B:
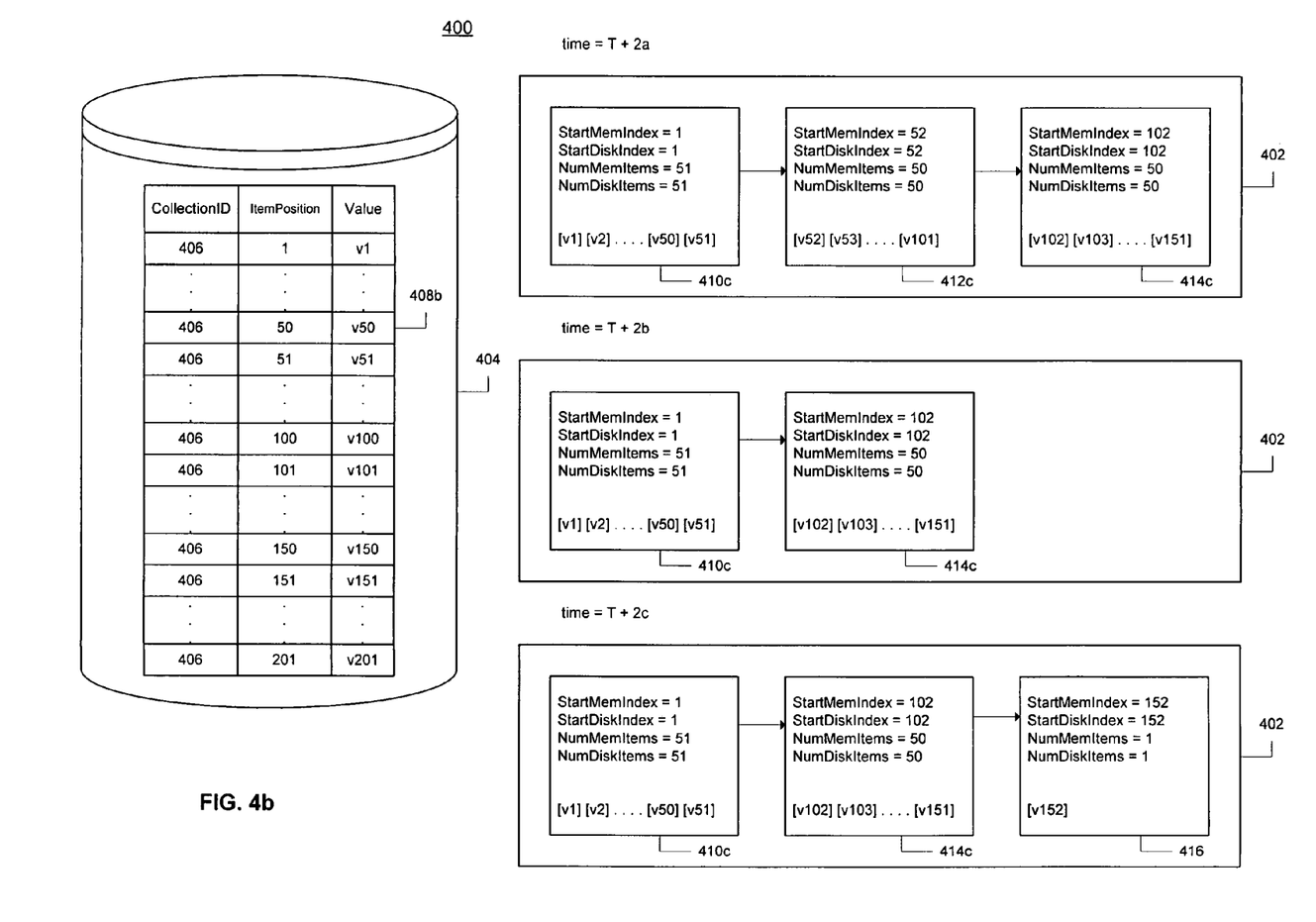

At 316, the metadata of the collection partitions that remain in the memory are updated. For range based collection partitions the metadata for the partition includes the index position of the first element of the partition (StartMemIndex) in the memory, the total number of elements in the partition (NumMemItems) in the memory, the index position of the first element of the partition (StartDiskIndex) on the disk, the total number of elements in the partition (NumDiskItems) on the disk. Note that the disk and the memory numbers can be different in case certain changes made to the partition or any partitions previous to it have not been propagated to the disk. This is depicted in FIG. 4a-b. In some embodiments, when a collection partition is updated, the metadata of the collection partition is updated. For example, if an element has been deleted from a collection partition, metadata related to the number of elements in the collection partition, is reduced by one.

After memory is freed, a new collection partition is then created in the memory (318) and at least one of the one or more required collection elements not already within a collection partition is loaded into the new collection partition (320). The method of FIG. 3 may be implemented using some or all of the formulas described with respect to FIG. 4a-b.

Examples of how document operation requests are handled in data storage systems are illustrated in FIGS. 4a-4b. In FIGS. 4a-4b, data storage system 400 includes a memory 402 and a disk 404. A collection 406 is stored in a table 408a on disk 404. Collection 406 in table 408a includes 200 items. Items 1-150 have already been loaded into three collection partitions 410a-414a in memory 402. In the embodiment, collection partitions 410a-414a are range-based and have been created on item indices. Collection partitions may be hash-based in other embodiments of the invention and need not be created on the indices. Additionally, collection partitions 410a-414a are linked together in the embodiment.

Initially, collection partitions 410a-414a each includes 50 items from collection 406. Collection partition 410a includes items 1-50, collection partition 412a includes items 51-100, and collection partition 414a includes items 101-150. In FIGS. 4a-4b, each collection partition includes metadata that identifies the index of the first collection item in the partition in memory 402, the index of the first collection item in the partition in table 408, the number of items in the partition in memory 402, and the number of items in the partition in table 408.

At time T, a document operation is executed. The operation seeks to insert an item after item 50. To find the partition to insert the item into, metadata in collection partitions 410a-414a may be utilized. For example, based on the "StartMemIndex" and "NumMemItems," it can be determined whether item 50 is in a particular collection partition. In one embodiment, an item i is within a collection partition when StartMemIndex<i≦(StartMemIndex+NumMemItems).

By looking at collection partitions 410a-414a in order, system 400 can determine whether item 50 is within one of the collection partitions 410a-414a in memory 402. Once a collection partition is found, item 50 can be located using an offset. For example, the location of an item in a collection partition may be found using the following formula:

memory location of $[i] = i - \text{StartMemIndex} + 1$

As a result of the insert operation, metadata for collection partition 410b is updated to reflect an additional item in memory 402. Since the change has not been propagated or flushed to disk 404, metadata relating to the number of disk items in collection partition 410b, "NumDiskItems," remains unchanged. Metadata for collection partitions 412b and 414b are also updated as a result of the operation. For example, metadata relating to the index of the first item in collection partitions 412b and 414b in memory 402, "StartMemIndex," have each been incremented by one to reflect the additional item in memory 402.

Changes to memory 402 can be propagated or flushed to disk 404. At time T+1, the changes to collection partitions 410a-414a are sent to disk 404. Table 408 can then be updated with the inserted item. As a result, collection 406 will have 201 items instead of 200 after the update, as shown in table 408b in FIG. 4b. Collection partitions 410c-414c are also updated once table 408 on disk 404 is updated. For example, "NumDiskItems" in partition 410c and "StartDiskIndex" in partitions 412c and 414c are incremented by one to reflect the additional item in collection 406. In one embodiment, when a partition is flushed to disk, its corresponding metadata is also removed from memory. For example, when partition 410c is flushed to disk, and the "NumDiskItems" in partition 410c is incremented indicating that the number of items on disk has increased, then the in-memory metadata for this partition is removed.

Reference will now be made to FIG. 4b. For the purposes of explanation, assume that any partitions flushed to disk in FIG. 4a, if any, have been loaded back into memory. At time T+2a in FIG. 4b, a document operation request to read item 152 in collection 406 is received. After looking through collection partitions 410c-414c, it is determined that item 152 is not within any of the partitions in memory 402. Assuming that an item cannot be loaded into collection partition 414c because it has reached the maximum partition size and memory 402 is full, then at least one of the collection partitions 410c-414c needs to be removed in order to load item 152 from disk 404 into memory 402 for the read operation.

In the embodiment, collection partition 412c is selected for removal. Since all of the changes to memory 402 have already been propagated to disk 404, collection partition 412c is removed at time T+2b without sending updates to disk 404 again. In other embodiments, collection partition 410c or 414c may be selected for removal instead. A new collection partition 416 is then created and item 152 is loaded into collection partition 416 in memory 402 at time T+2c. Once item 152 is loaded into memory 402, the read operation can be executed. Once a partition is flushed, its associated metadata at can also be removed from memory. Therefore, if it is assumed that the data for partition 412c has been flushed, then the metadata for this partition can be removed from memory.

To locate item 152 on disk 404 for loading into collection partition 416 in memory 402, metadata of collection partition 414c may be used since the index of item 152 is higher than the index of the last item in collection partition 414c and there are no other collection partitions after partition 414c. If on the other hand, there was another collection partition after partition 414c and the other collection partition had a StartMemIndex higher than the index of item 152, then metadata from collection partition 414c would still be used. It can be assumed that for items with indexes higher than the index of the last item in collection partition 414c, there are no inconsistencies between an item's position in table 408 on disk 404 and the item's position in memory 402. In one embodiment, the location of an item on a disk can be found using the following formula:

disk location of $[i] = i + (\text{EndDiskIndex} - \text{EndMemIndex})$

EndDiskIndex=StartDiskIndex+NumDiskItems

EndMemIndex=StartMemIndex+NumMemItems

The "StartDiskIndex," "NumDiskItems," "StartMemIndex," and "NumMemItems" are all from the last collection partition in the memory with a StartMemIndex and an EndMemIndex lower than the Index of item i. In the embodiment of FIG. 4b, the last collection partition satisfying the above requirement is collection partition 414c. Other elements may also be simultaneously read from disk along with the 152 elements, depending upon the threshold parameters that have been set for the system.

Figure 5:
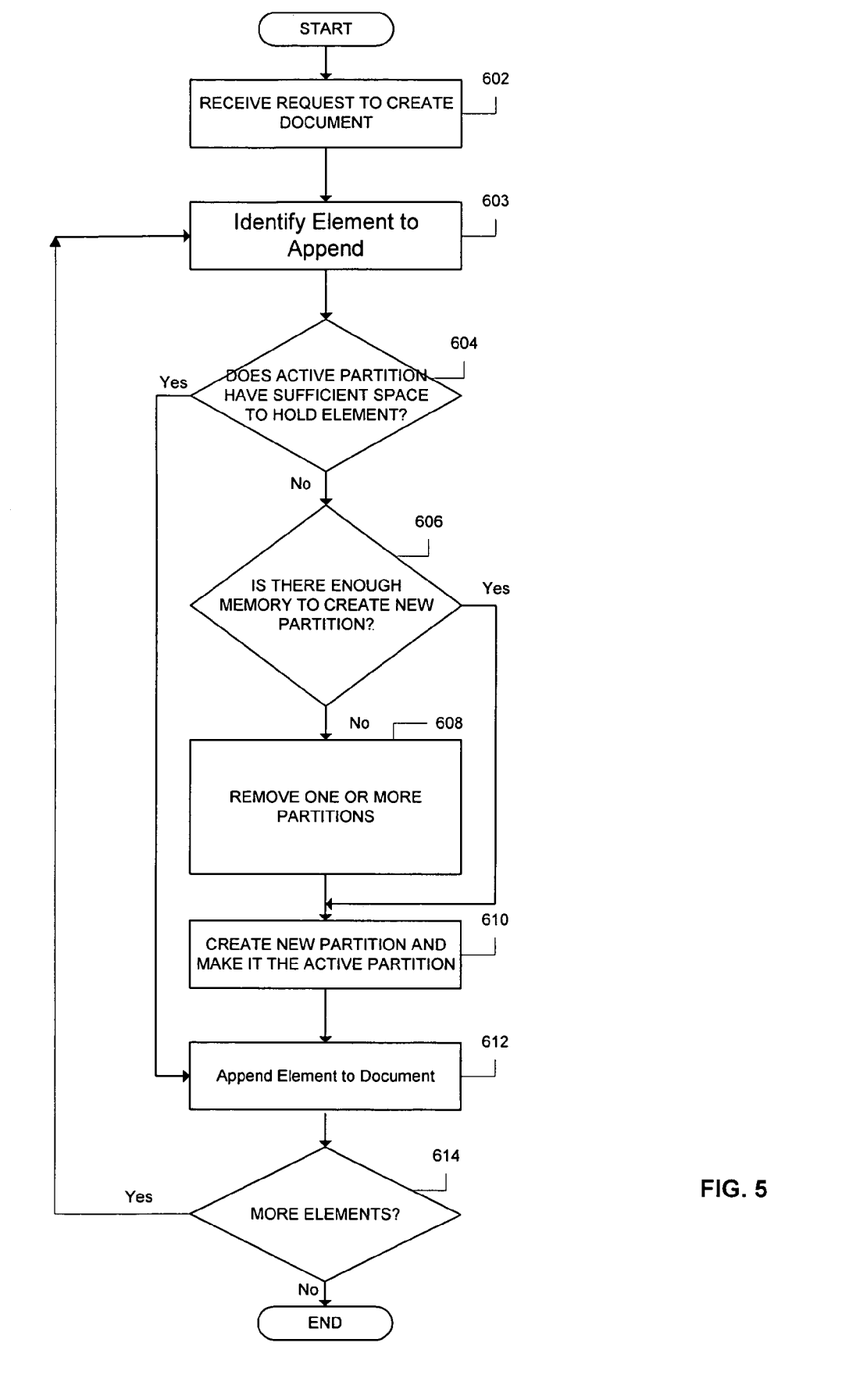
FIG. 5 is a flow chart of a method for handling document operation requests according to an embodiment of the invention.

FIG. 5 shows a flowchart of a method for creating a document In addition, this method can also be used to create a partition upon first creation of a collection. At 602, a document creation request is received. This request is processed by issuing appends of the new elements to the collection that is being created in the memory. Each document may include one or more collections and each collection may include one or more elements or items. In some embodiments, the document is an XML document. In other embodiments, the document may be any document that encompasses one or more collections. At 603, an element is identified for being appended to the collection For this method, an "active" partition can be designated, and this active partition is the one which receives new elements to be processed by the system. For the first element appended to the collection a new partition is created and is designated as an active partition. For all other subsequent elements the partition to which the previous element was added is the active partition.

A determination is made as to whether the active partition has sufficient space to hold the identified element (604). If there is sufficient space in the active partition, then the identified element is Stored in the active partition (612). If an active partition exists, it may be that it already contains enough elements such that it cannot hold the additional identified element. As noted above, each collection partition in the memory may be limited to a threshold size controlled by loadableunit_size. The threshold size may be a factor of the memory size and it may also be set by a user, administrator, etc. For a new collection, it may be that there is not yet an existing active partition—therefore, there is a determination that the "active" (i.e., non-existing) partition does not have sufficient space.

If there is insufficient space in the active partition, then a determination is made whether there is sufficient memory to create a new partition (606). If not, then one or more existing partitions in memory are removed, e.g., using the process described with respect to FIG. 3 (608). Once there is sufficient memory to create a new partition, it is created and is designated as the new active partition (610).

Once there is an active partition that has sufficient space to store the element, the identified element can then be loaded into the active partition (612). At 614, a determination is made whether more elements need to be processed. If so, then the method returns back to 603 to identify another element to process.

System Architecture Overview

Figure 6:
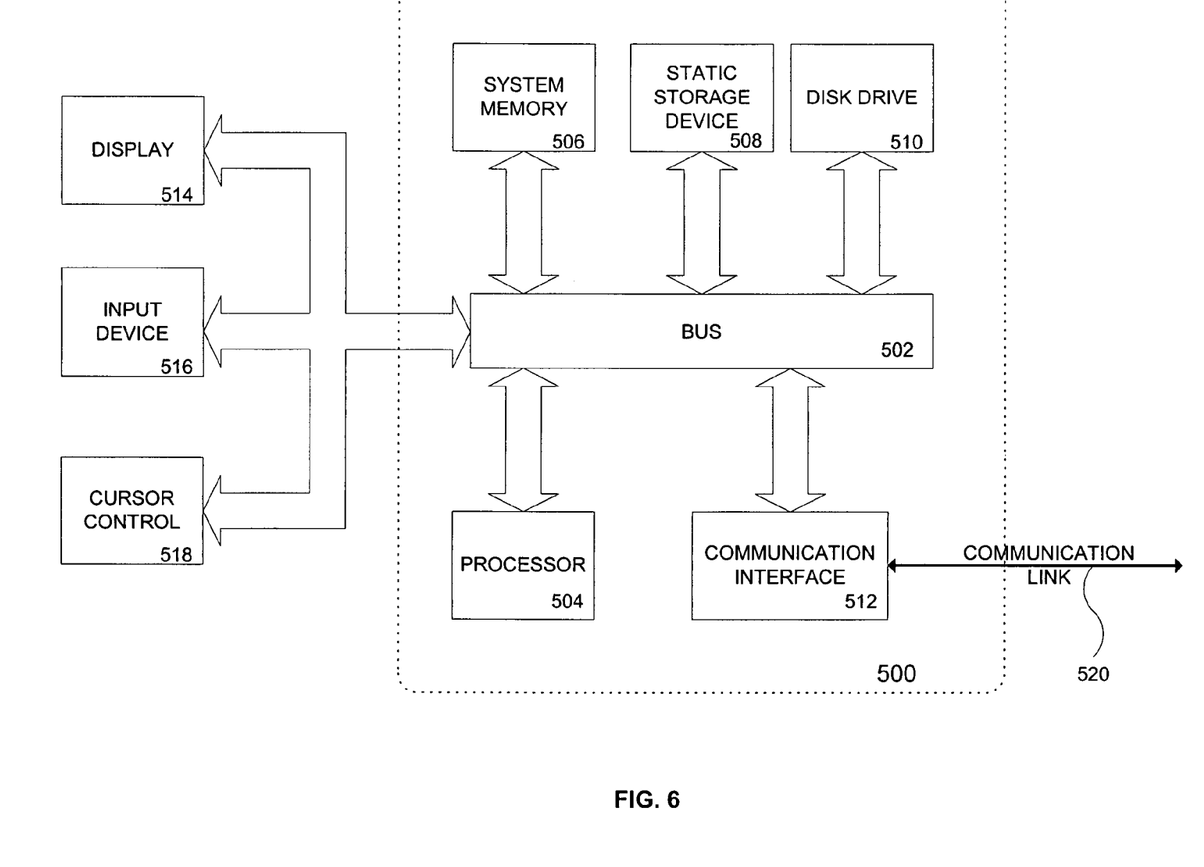
FIG. 6 is a diagram of a computer system with which embodiments of the present invention can be implemented.

FIG. 6 is a block diagram of a computer system 500 suitable for implementing an embodiment of the present invention. Computer system 500 includes a bus 502 or other communication mechanism for communicating information, which interconnects subsystems and devices, such as processor 504, system memory 506 (e.g., RAM), static storage device 508 (e.g., ROM), disk drive 510 (e.g., magnetic or optical), communication interface 512 (e.g., modem or ethernet card), display 514 (e.g., CRT or LCD), input device 516 (e.g., keyboard), and cursor control 518 (e.g., mouse or trackball).

According to one embodiment of the invention, computer system 500 performs specific operations by processor 504 executing one or more sequences of one or more instructions contained in system memory 506. Such instructions may be read into system memory 506 from another computer readable medium, such as static storage device 508 or disk drive 510. In alternative embodiments, hard-wired circuitry may be used in place of or in combination with software instructions to implement the invention.

The term "computer readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as disk drive 510. Volatile media includes dynamic memory, such as system memory 506. Transmission media includes coaxial cables, copper wire, and fiber optics, including wires that comprise bus 502. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In an embodiment of the invention, execution of the sequences of instructions to practice the invention is performed by a single computer system 500. According to other embodiments of the invention, two or more computer systems 500 coupled by communication link 520 (e.g., LAN, PTSN, or wireless network) may perform the sequence of instructions required to practice the invention in coordination with one another.

Computer system 500 may transmit and receive messages, data, and instructions, including program, i.e., application code, through communication link 520 and communication interface 512. Received program code may be executed by processor 504 as it is received, and/or stored in disk drive 510, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method of handling document operation requests and storing results of document operations requests in a volatile or non-volatile computer readable medium, the method comprising:
   receiving a document operation request, the document operation requiring one or more collection elements within the document to be in a computer-readable memory, wherein the one or more collection elements are designated to be part of the collection with a markup language;
   identifying at least one of the one or more collection elements for processing;
   determining whether the at least one of the one or more collection elements is in the computer-readable memory by using a processor;
   identifying a collection partition which comorises the at least one of the one or more collection elements, wherein the collection partition comprises a subset of the one or more collection elements in the document;
   loading the collection partition into the computer-readable memory based on a result from the act of determining, wherein
      the at least one of the one or more collection elements is loaded into the computer-readable memory when the at least one of the one or more collection elements is not in the computer-readable memory, and
      another collection partition and a data which is used to manage respective collection elements of the another collection partition are removed from the computer-readable memory after a change in one or more of the respective collection elements of the another collection partition is persisted in a second computer-readable memory where there is insufficient space for loading the collection partition; and
   executing the document operation with the collection partition and displaying a result of the act of executing the document operation on a display apparatus or storing the result in a storage device or a tangible computer-readable memory.

2. The method of claim 1, wherein the collection partition does not exceed a threshold size.

3. The method of claim 2, wherein the threshold size is a factor of the memory size.

4. The method of claim 2, wherein the threshold size is user defined.

5. The method of claim 1, wherein the memory is fixed in size.

6. The method of claim 1, wherein the collection partition is a unit in which data is written to or read from a data storage device.

7. The method of claim 1, wherein the collection partition comprises collection elements from one collection.

8. The method of claim 1, wherein the collection partition is a disjoint subset of a collection in the document.

9. The method of claim 1, wherein loading the at least one identified collection element into memory comprises:
loading the at least one identified collection element into a new collection partition in the memory when the at least one identified collection element is not in the memory.

10. The method of claim 1, further comprising:
determining whether the memory is full;
selecting one or more collection partitions in the memory for removal when the memory is full;
propagating one or more changes in each of the one or more selected collection partitions to one or more data storage devices storing one or more collection elements in the selected collection partition;
removing the one or more selected collection partitions from the memory; and
updating one or more collection partitions that remain in the memory.

11. The method of claim 10, wherein the memory is full when the memory is above a threshold.

12. The method of claim 11, wherein the threshold is user defined.

13. The method of claim 10, wherein selecting one or more collection partitions in the memory for removal comprises:
selecting one or more least recently used collection partitions in the memory for removal when the memory is full.

14. The method of claim 10, wherein updating one or more collection partitions comprises:
updating metadata corresponding to the one or more collection partitions that remain in the memory.

15. The method of claim 10, wherein the one or more selected collection partitions do not contain any of the one or more required collection elements.

16. The method of claim 1, wherein the document operation is a read, update, delete, insert, or create operation.

17. The method of claim 1, wherein the one or more required collection elements are part of one collection.

18. The method of claim 1, wherein determining whether the at least one identified collection element is in the memory comprises:
determining whether a collection partition corresponding to the at least one identified collection element has already been loaded into memory.

19. The method of claim 18, wherein loading the at least one identified collection element into memory comprises:
loading the corresponding collection partition into memory when the corresponding collection partition has not already been loaded into memory.

20. The method of claim 1, wherein the document is an XML document.

21. A computer program product that includes a computer readable medium, the computer readable storage medium being a non-volatile medium or a volatile medium, the computer readable storage medium comprising a plurality of instructions which, when executed by a processor, cause the processor to execute a process for handling document operation requests, the process comprising:
receiving a document operation request, the document operation requiring one or more collection elements within the document to be in a computer-readable memory, wherein the collection comprises a set of collection elements designated to be part of the collection with a markup language;
identifying at least one of the one or more collection elements for processing;
determining whether the at least one or more collection elements is in the computer-readable memory by using the processor;
identifying a collection partition which comprises the at least one of the one or more collection elements, wherein the collection partition comprises a subset of the one or more collection elements in the document;
loading the collection partition into the computer-readable memory based on a result from the act of determining, wherein
the at least one of the one or more collection elements is loaded into the computer-readable memory when the at least one of the one or more collection elements is not in the computer-readable memory, and
another collection partition and a data which is used to manage respective collection elements of the another collection partition are removed from the computer-readable memory after a change in one or more of the respective collection elements of the another collection partition is persisted in a second computer-readable memory where there is insufficient space for loading the collection partition; and
executing the document operation with the collection partition and displaying a result of the act of executing the document operation on a display apparatus or storing the result in a storage device or a tangible computer-readable memory.

22. The computer program product of claim 21, wherein the collection partition does not exceed a user-defined threshold size.

23. The computer program product of claim 21, wherein the memory is fixed in size.

24. The computer program product of claim 21, wherein the collection partition is a unit in which data is written to or read from a data storage device.

25. The computer program product of claim 21, wherein the collection partition is a disjoint subset of a collection in the document.

26. The computer program product of claim 21, wherein loading the at least one identified collection element into memory comprises:
loading the at least one identified collection element into a new collection partition in the memory when the at least one identified collection element is not in the memory.

27. The computer program product of claim 21, wherein the process further comprises:
determining whether the memory is full;
selecting one or more collection partitions in the memory for removal when the memory is full;
propagating one or more changes in each of the one or more selected collection partitions to one or more data storage devices storing one or more collection elements in the selected collection partition;
removing the one or more selected collection partitions from the memory; and
updating one or more collection partitions that remain in the memory.

28. The computer program product of claim 27, wherein the memory is full when the memory is above a user-defined threshold.

29. The computer program product of claim 27, wherein selecting one or more collection partitions in the memory for removal comprises:
   selecting one or more least recently used collection partitions in the memory for removal when the memory is full.

30. The computer program product of claim 27, wherein updating one or more collection partitions comprises:
   updating metadata corresponding to the one or more collection partitions that remain in the memory.

31. The computer program product of claim 21, wherein the document operation is a read, update, delete, insert, or create operation.

32. The computer program product of claim 21, wherein determining whether the at least one identified collection element is in the memory comprises:
   determining whether a collection partition corresponding to the at least one identified collection element has already been loaded into memory.

33. The computer program product of claim 32, wherein loading the at least one identified collection element into memory comprises:
   loading the corresponding collection partition into memory when the corresponding collection partition has not already been loaded into memory.

34. A system for handling document operation requests, the system comprising:
   means for receiving a document operation request, the document operation requiring one or more collection elements within the document to be in a computer-readable memory, wherein the collection comprises a set of collection elements designated to be part of the collection with a markup language:
   means for identifying at least one of the one or more collection elements for processing;
   a processor configured for determining whether the at least one of the one or more collection elements is in the computer-readable memory;
   means for identifying a collection partition which comprises the at least one of the one or more collection elements, wherein the collection partition comprises a subset of the one or more collection elements in the document;
   means for loading the collection partition into memory based on a result from the act of determining, wherein the means for loading loads the at least one of the one or more collection elements into the computer-readable memory when the at least one of the one or more collection elements is not in the computer-readable memory, and
   another collection partition and a data which is used to manage respective collection elements of the another collection partition are removed from the computer-readable memory after a change in one or more of the respective collection elements of the another collection partition is persisted in a second computer-readable memory where there is insufficient space for loading the collection partition; and
   means for executing the document operation with the collection partition and a display apparatus configured for displaying a result of the executing the document operation or a storage device or a tangible computer-readable memory for storing the result.

35. The system of claim 34, wherein the collection partition does not exceed a user-defined threshold size.

36. The system of claim 34, wherein the memory is fixed in size.

37. The system of claim 34, wherein the collection partition is a unit in which data is written to or read from a data storage device.

38. The system of claim 34, wherein the collection partition is a disjoint subset of a collection in the document.

39. The system of claim 34, wherein means for loading the at least one identified collection element into memory comprises:
   means for loading the at least one identified collection element into a new collection partition in the memory when the at least one identified collection element is not in the memory.

40. The system of claim 34, further comprising:
   means for determining whether the memory is full;
   means for selecting one or more collection partitions in the memory for removal when the memory is full;
   means for propagating one or more changes in each of the one or more selected collection partitions to one or more data storage devices storing one or more collection elements in the selected collection partition;
   means for removing the one or more selected collection partitions from the memory; and
   means for updating one or more collection partitions that remain in the memory.

41. The system of claim 40, wherein the memory is full when the memory is above a user-defined threshold.

42. The system of claim 40, wherein means for selecting one or more collection partitions in the memory for removal comprises:
   means for selecting one or more least recently used collection partitions in the memory for removal when the memory is full.

43. The system of claim 40, wherein means for updating one or more collection partitions comprises:
   means for updating metadata corresponding to the one or more collection partitions that remain in the memory.

44. The system of claim 34, wherein the document operation is a read, update, delete, insert, or create operation.

45. The system of claim 34, wherein means for determining whether the at least one identified collection element is in the memory comprises:
   means for determining whether a collection partition corresponding to the at least one identified collection element has already been loaded into memory.

46. The system of claim 45, wherein means for loading the at least one identified collection element into memory comprises:
   means for loading the corresponding collection partition into memory when the corresponding collection partition has not already been loaded into memory.

47. The method of claim 1, in which the collection partition is defined by a partitioning function.

48. The method of claim 47, in which the partitioning function comprises a hash-based partitioning function or a range-based partitioning function.

49. The computer program product of claim 21, in which the collection partition is defined by a partitioning function.

50. The computer program product of claim 49, in which the partitioning function comprises a hash-based partitioning function or a range-based partitioning function.

51. The system of claim 34, in which the collection partition is defined by a partitioning function.

52. The system of claim 51, in which the partitioning function comprises a hash-based partitioning function or a range-based partitioning function.

* * * * *

UNITED STATES PATENT AND TRADEMARK OFFICE
CERTIFICATE OF CORRECTION

PATENT NO.        : 7,617,249 B2                                              Page 1 of 1
APPLICATION NO.   : 10/656795
DATED             : November 10, 2009
INVENTOR(S)       : Ashish Thusoo et al.

It is certified that error appears in the above-identified patent and that said Letters Patent is hereby corrected as shown below:

Title page, Item [*] Notice: Delete the phrase "by 415 days" and insert -- by 500 days --.

On page 2, in column 2, under "Other Publications", before "XML" delete "of" and insert -- for --, therefor.

On sheet 1 of 7, in Figure 1, Box. No. 108, line 1-3, delete "LOAD PARTITION CORRESPONDING TO ___MENT INTO MEMORY" and insert -- LOAD PARTITION CORRESPONDING TO ELEMENT INTO MEMORY --, therefor.

On sheet 2 of 7, in Figure 2, above Box. 202, line 1, above "Box. 202" insert -- 200 --.

In column 5, line 18-19, delete "$StartMemIndex < i \leqq (StartMemIndex+NumMemItems)$," and insert -- $StartMemIndex \leq i < (StartMemIndex + NumMemItems)$, --, therefor.

In column 6, line 39, delete "Index" and insert -- index --, therefor.

In column 6, line 56, after "collection" insert -- . --.

In column 8, line 40, in claim 1, delete "comorises" and insert -- comprises --, therefor.

In column 11, line 35, in claim 34, delete "language:" and insert -- language; --, therefor.

Signed and Sealed this

Thirty-first Day of August, 2010

David J. Kappos
*Director of the United States Patent and Trademark Office*